United States Patent
Usui et al.

(10) Patent No.: US 11,531,464 B2
(45) Date of Patent: Dec. 20, 2022

(54) MULTI-FUNCTION PERIPHERAL INCLUDING HANDWRITING MODE AND PROCESSING METHOD THEREOF

(71) Applicant: ROHM CO., LTD., Kyoto (JP)

(72) Inventors: Hirotoshi Usui, Kyoto (JP); Katsumasa Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/838,475

(22) Filed: Apr. 2, 2020

(65) Prior Publication Data

US 2020/0236248 A1 Jul. 23, 2020

Related U.S. Application Data

(63) Continuation of application No. PCT/JP2018/034912, filed on Sep. 20, 2018.

(30) Foreign Application Priority Data

Oct. 2, 2017 (JP) ............................. JP2017-192712

(51) Int. Cl.
*G06F 3/04845* (2022.01)
*G06F 3/04883* (2022.01)
*G06F 3/0488* (2022.01)
*H04N 1/00* (2006.01)
*H04N 1/387* (2006.01)

(52) U.S. Cl.
CPC ........ *G06F 3/04883* (2013.01); *G06F 3/0488* (2013.01); *G06F 3/04845* (2013.01); *H04N 1/00411* (2013.01); *H04N 1/387* (2013.01)

(58) Field of Classification Search
None
See application file for complete search history.

(56) References Cited

U.S. PATENT DOCUMENTS

| 2007/0076980 | A1 | 4/2007 | Maeda et al. | |
|---|---|---|---|---|
| 2010/0128312 | A1 | 5/2010 | Maeda et al. | |
| 2011/0242563 | A1 | 10/2011 | Maeda et al. | |
| 2014/0233047 | A1* | 8/2014 | Kishimoto | H04N 1/00838 358/1.9 |
| 2018/0020106 | A1* | 1/2018 | Katsuyama | H04N 1/00564 |

FOREIGN PATENT DOCUMENTS

| CN | 103997588 A | 8/2014 |
|---|---|---|
| CN | 104902133 A | 9/2015 |
| CN | 107066132 A | 8/2017 |

(Continued)

OTHER PUBLICATIONS

JPO Notice of Reasons for Refusal for corresponding JP Application No. 2019-546621; dated, May 18, 2021.

(Continued)

*Primary Examiner* — Rinna Yi
(74) *Attorney, Agent, or Firm* — Cantor Colburn LLP

(57) ABSTRACT

A multi-function peripheral includes a touch panel monitor. The touch panel monitor includes a display panel and a touch panel overlaid on the display panel. In a handwriting mode, an intermediate image corresponding to an original image is displayed on the display panel. When touch input to the touch panel is detected in this state, a touch image based on the touch input is superimposed on the original image, and a new image is generated.

5 Claims, 8 Drawing Sheets

(56) References Cited

FOREIGN PATENT DOCUMENTS

| JP | S5952811 A | 3/1984 |
| JP | S6377064 A | 4/1988 |
| JP | S63146567 A | 6/1988 |
| JP | S6440852 A | 2/1989 |
| JP | 2760396 B2 | 5/1998 |
| JP | 2003264760 A | 9/2003 |
| JP | 2007124617 A | 5/2007 |
| JP | 2015076814 A | 4/2015 |
| JP | 2017091560 A | 5/2017 |

OTHER PUBLICATIONS

International Search Report corresponding to International Application No. PCT/JP2018/034912; dated Dec. 4, 2018.
International Preliminary Report on Patentability with Written Opinion of the International Searching Authority, dated Apr. 12, 2018 for International Application No. PCT/JP2018/034912; International Filing Date Sep. 20, 2018; IPRP dated Apr. 16, 2020; 17 pages.
JPO Notice of Reasons of Refusal for corresponding JP Application No. 2019-546621; dated Nov. 16, 2021.
CNIPA The First Office Action for corresponding CN Application No. 201880064515.4; dated, Jul. 1, 2021.
CNIPA The Third Office Action for corresponding CN Application No. 201880064515.4, dated Jun. 15, 2022.
CNIPA Second Office Action and Search Report for corresponding CN Application No. 201880064515.4; dated Jan. 17, 2022.
CNIPA Rejection Decision for corresponding CN Application No. 201880064515.4; dated Oct. 8, 2022.

\* cited by examiner

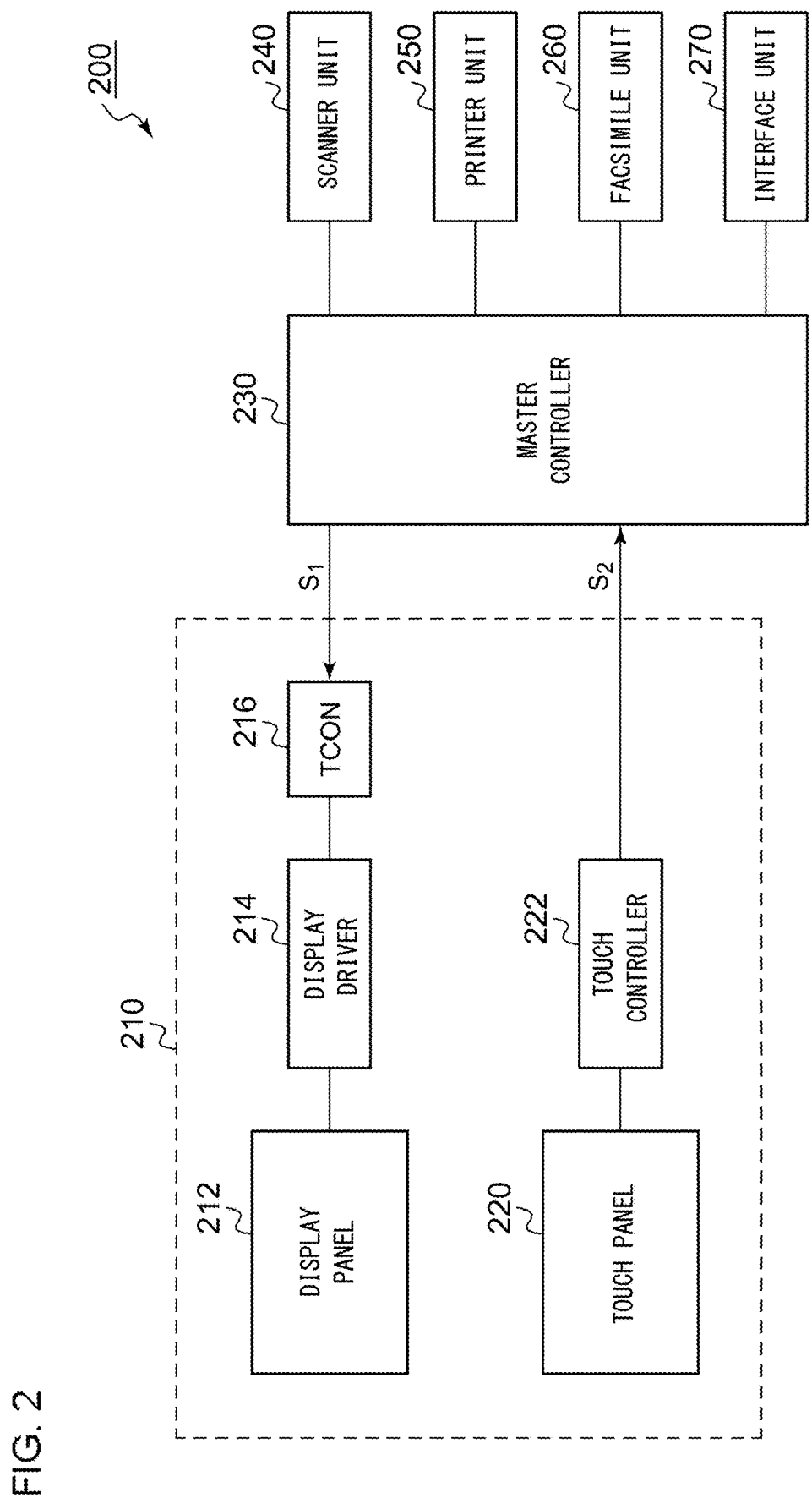

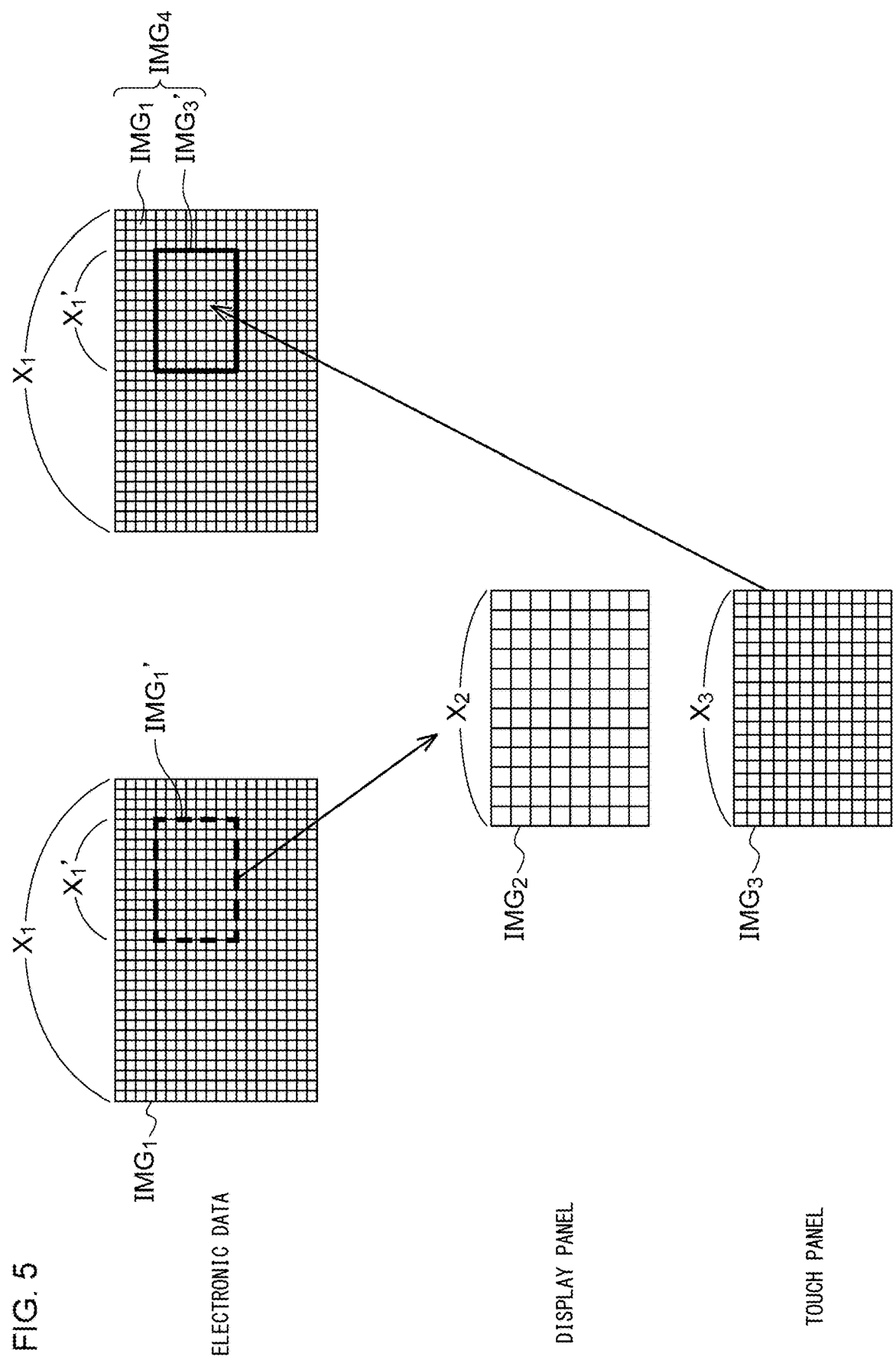

MULTI-FUNCTION PERIPHERAL INCLUDING HANDWRITING MODE AND PROCESSING METHOD THEREOF

CROSS REFERENCE TO RELATED APPLICATIONS

This application is a continuation under 35 U.S.C. § 120 of PCT/JP2018/034912, filed Sep. 20, 2018, which is incorporated herein reference and which claimed priority to Japanese Application No. 2017-192712, filed Oct. 2, 2017. The present application likewise claims priority under 35 U.S.C. § 119 to Japanese Application No. 2017-192712, filed Oct. 2, 2017, the entire content of which is also incorporated herein by reference

BACKGROUND OF THE INVENTION

1. Field of the Invention

The present invention relates to a multi-function peripheral.

2. Description of the Related Art

A display with a touch panel is now increasingly mounted on various electronic apparatuses, office automation apparatuses, industrial machines, automobiles, and the like. The touch panel makes it possible to perform various kinds of operation, such as selecting a function, setting the number of prints, setting a scale, and selecting a sheet size, which is not exceptional in a multi-function peripheral integrating a copy function and a facsimile function (referred to as a scanner apparatus in the present specification) in addition to a scanner dedicated apparatus or a scanner function that digitizes an image and a document.

SUMMARY OF THE INVENTION

The present invention is made in view of an above-described circumstance, and one of exemplary general purposes of an embodiment thereof is to provide a multi-function peripheral having a handwriting input function and/or a stamp function.

One embodiment of the present invention relates to a multi-function peripheral. The multi-function peripheral includes a touch panel monitor that includes a display panel and a touch panel overlaid on the display panel. In a handwriting mode, when touch input to the touch panel is detected in a state where an intermediate image corresponding to an original image is displayed on the display panel, a touch image based on the touch input is superimposed on the original image to generate a new image.

Conventionally, a touch panel used as a button key is used as a device to input an image, and a new image can be generated by adding a graphic or a character in handwriting as if it was written on the original image in the state where the original image is displayed on the display panel.

The multi-function peripheral may generate an overlay image obtained by scaling a touch image in accordance with a resolution of the original image and may superimpose the overlay image on the original image. In a case where a resolution (the number of pixels) of the touch image differs from the resolution of the original image, handwriting input can be added at a correct scale by generating the overlay image.

In a stamp mode, when touch input to the touch panel is detected in the state where the intermediate image corresponding to the original image is displayed on the display panel, a new image may be generated by superimposing a stamp image on a portion corresponding to the touch input of the original image.

It may be possible to change a magnification at the time of displaying the intermediate image on the display panel.

Note that one embodiment of the present invention effectively includes a case where the above-described constituent elements are arbitrarily combined and a case where the wordings and the terms used in the present invention are converted between a method, an apparatus, and the like.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a functional block diagram of the multi-function peripheral;

FIG. 5 is a diagram to describe generation of an original image, a touch image, and a new image;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a state represented by "a member A is coupled to a member B" includes not only a case where the member A is physically directly coupled to the member B but also a case where the member A and member B are indirectly coupled via another member that does not substantially affect an electric connection state therebetween or does not impair functions and effects provided by coupling the members.

Similarly, a state represented by "a member C is provided between the member A and the member B" includes not only a case where the member A is directly coupled to the member C or the member B is directly coupled to the member C but also a case where the member A is indirectly coupled to the member C or the member B is indirectly coupled to the member C via another member that does not substantially affect an electric connection state therebetween and does not impair functions and effects provided by coupling the members.

Figure 1:
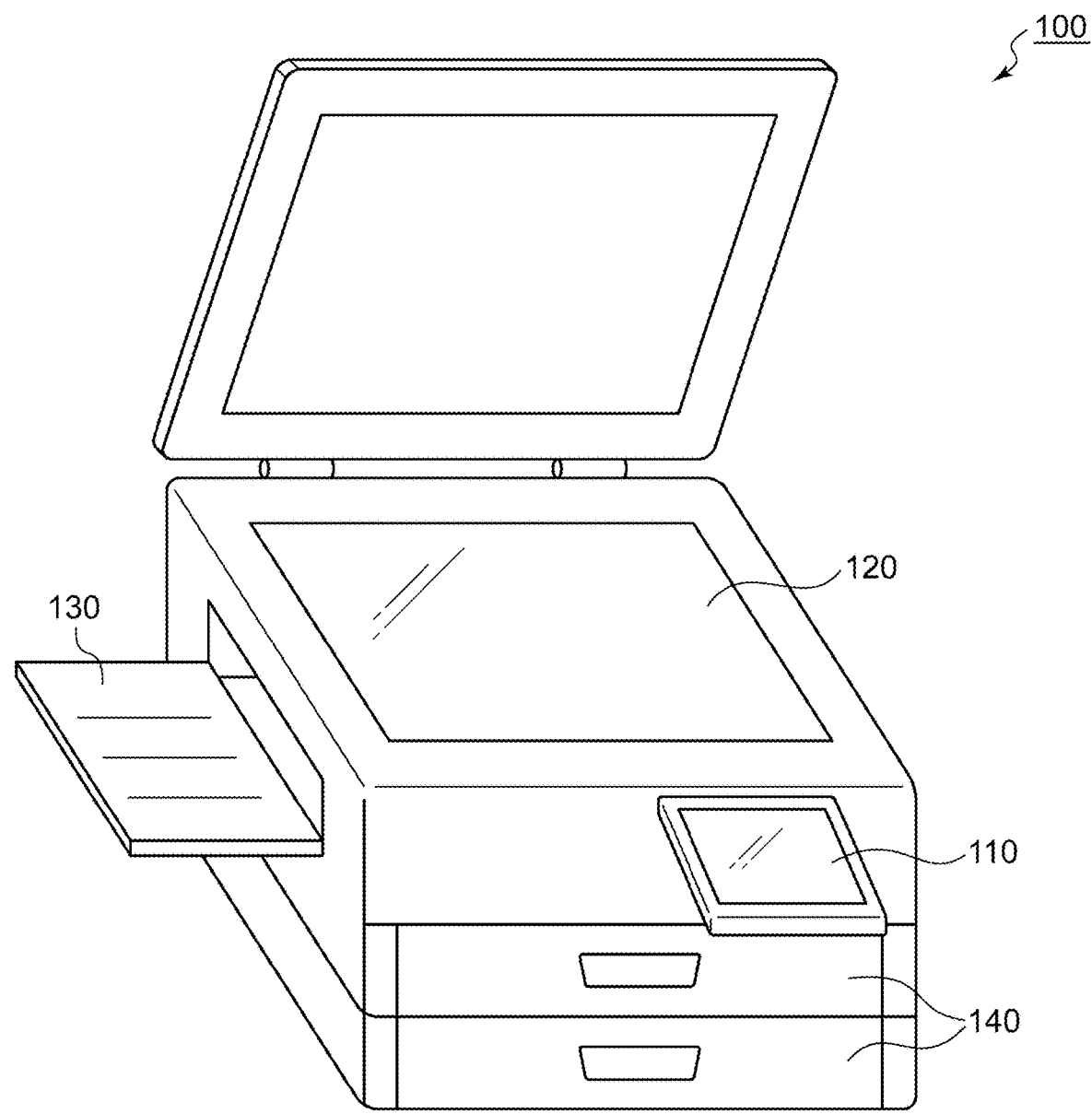
FIG. 1 is a view illustrating a multi-function peripheral according to an embodiment.

FIG. 1 is a view illustrating a multi-function peripheral 100 according to an embodiment. The multi-function peripheral 100 includes functions of a printer, a copier, and a scanner. The multi-function peripheral 100 may further include a facsimile function. The multi-function peripheral 100 includes a touch panel monitor 110, a scanner unit 120, a sheet ejection tray 130, and a sheet feeding tray 140. A printing unit is built inside the multi-function peripheral 100.

The scanner unit 120 digitizes an image written on a sheet (not illustrated). In a scanner mode, the digitized image data is stored in a memory. In a printer mode or a facsimile mode, the digitized image data is used for printing or transmission.

In a copy mode or the printer mode, a sheet is fed from the sheet feeding tray 140 to the printing unit. The printing unit prints an image corresponding to electronic data on the sheet. The electronic data in the copy mode is data read by the scanner unit 120. The electronic data in the printer mode is supplied from an external computer or read from a data storage medium (external memory) such as an SD card (not illustrated). The printing unit may employ a laser system or an inkjet system. The printed sheet is ejected from the sheet ejection tray 130.

The touch panel monitor 110 is provided as a user interface. Touch panel monitor 110 includes a display panel and a touch panel. The display panel is a liquid crystal panel or an organic electro luminescence (EL) panel and can present various graphic information and various character information. The touch panel is provided in a manner overlaid on the display panel. For the touch panel, a resistance type or a capacitance type can be used.

Normally, the touch panel monitor 110 displays various graphic information, various text information, and the like, and also displays buttons and the like. Additionally, a function as an image input device is provided in a handwriting mode described later.

The entire configuration of the multi-function peripheral 100 is as described above. FIG. 2 is a functional block diagram of a multi-function peripheral 200. The multi-function peripheral 200 includes a touch panel monitor 210, a master controller 230, a scanner unit 240, a printer unit 250, a facsimile unit 260, and an interface unit 270.

The master controller 230 is a processor that integrally controls the entire multi-function peripheral 200 and includes a central processing unit (CPU) or a microcomputer. The scanner unit 240 converts image information printed on a sheet into electronic data. The printer unit 250 prints, on a sheet, image data supplied from the master controller 230. The facsimile unit 260 transmits, via a telephone line, the image data supplied from the master controller 230. The interface unit 270 includes the Ethernet (registered trademark), a universal serial bus (USB), and the like, and transmits/receives various kinds of data to/from the outside. In the multi-function peripheral including the facsimile function, the interface unit 270 includes an interface with the telephone line.

The touch panel monitor 210 includes a display panel 212 and a touch panel 220 as described above. The touch panel monitor 210 displays, on the display panel 212, image data $S_1$ transmitted from master controller 230. Additionally, the touch panel monitor 210 detects touch input to the touch panel 220 and transmits data $S_2$ indicating the detection result to the master controller 230.

The touch panel monitor 210 includes a display driver 214, a timing controller 216, and a touch controller 222 in addition to the display panel 212 and the touch panel 220.

The timing controller 218 receives the image data $S_1$ from the master controller 230.

The display driver 214 includes a gate driver and a source driver and drives the display panel 212 on the basis of the image data $S_1$ received by the timing controller 216.

The touch controller 222 is coupled to the touch panel 220 and detects touch input to the touch panel 220. The touch controller 222 generates the data $S_2$ including touched coordinates or a correlation with the coordinates. In the present embodiment, the touch panel 220 employs the resistance type, and touch controller 222 measures voltage (or electric current) generated at the touch panel 220. The data $S_2$ may indicate resistance.

Figure 3A:
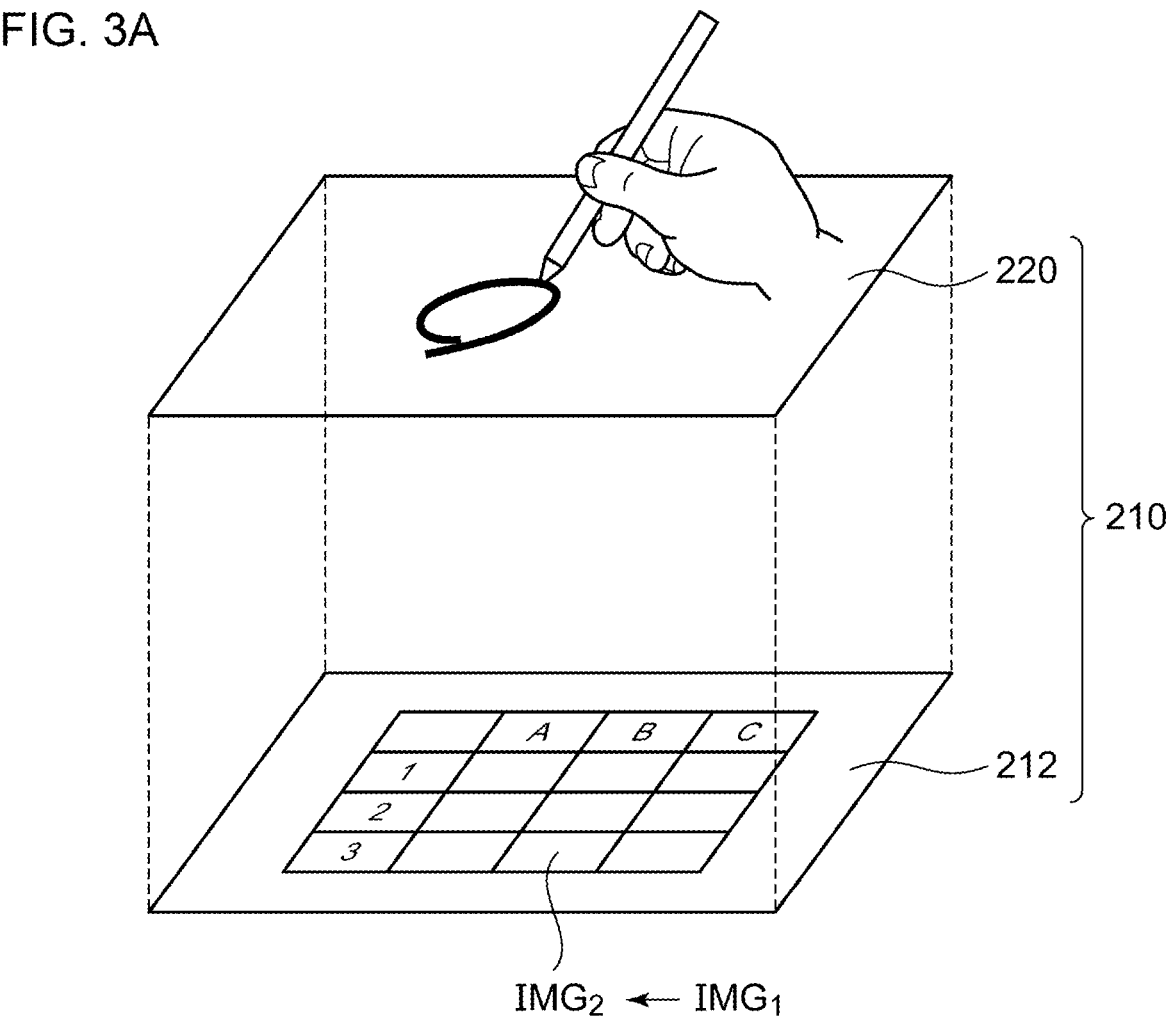
FIG. 3A and FIG. 3B are diagrams to describe a handwriting mode.
Figure 3B:
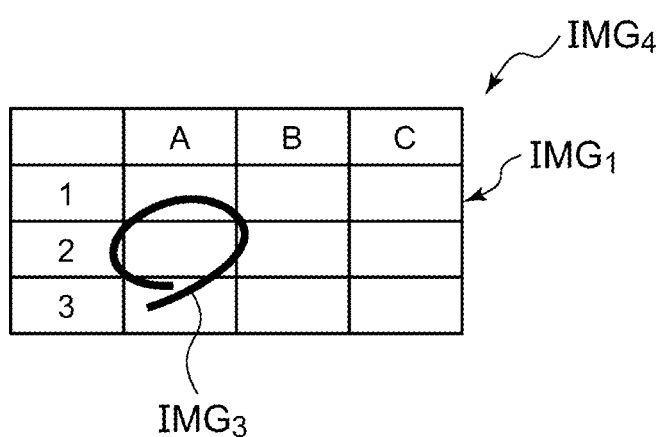

The entire configuration of the multi-function peripheral 200 is as described above. The multi-function peripheral 200 supports the handwriting mode. FIGS. 3A and 3B are diagrams to describe the handwriting mode. In the handwriting mode, touch input to the touch panel 220 is monitored in a state where an intermediate image $IMG_2$ corresponding to an original image $IMG_1$ is displayed on the display panel 212. The number of pixels (resolution) of the intermediate image $IMG_2$ conforms to the number of pixels of the display panel 212 and has nothing to do with the number of pixels of the original image $IMG_1$. The intermediate image $IMG_2$ is an entire part or a part of the original image $IMG_1$, and the intermediate image $IMG_2$ is generated by appropriately trimming and scaling the original image $IMG_1$. A user can select a range of the original image $IMG_1$ to be displayed on the display panel 212.

Then, when touch input is detected, a touch image $IMG_3$ based on the touch input is generated. Then, as illustrated in FIG. 3B, a new image $IMG_4$ is generated by superimposing the touch image $IMG_3$ on the original image $IMG_1$.

Figure 4A:
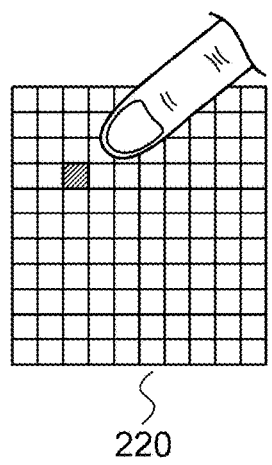
FIG. 4A and FIG. 4B are diagrams to describe generation of a touch image.
Figure 4B:
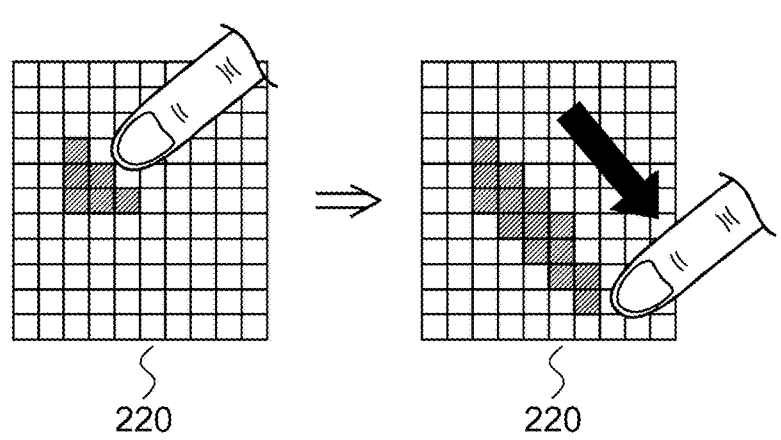

FIG. 4A and FIG. 4B are diagrams to describe generation of a touch image $IMG_3$. A colored portion indicates a portion that has been touched with a finger or a stylus pen. As illustrated in FIG. 4A, when only one point is touched, a pixel corresponding to the point is colored. In a case where the finger is made to slide as illustrated in FIG. 4B, a continuous straight line or curve can be drawn.

Next, generation of an original image $IMG_1$, a touch image $IMG_3$, and a new image $IMG_4$ will be described in detail. FIG. 5 is a diagram to describe generation of the original image $IMG_1$, the touch image $IMG_3$, and the new image $IMG_4$. Here, the image processing will be described while focusing only on the number of pixels (or resolution) in a horizontal direction of each image.

The number of pixels in the horizontal direction of the original image $IMG_1$ is defined as $X_1$. In a case where the original image $IMG_1$ is an image captured by the scanner unit, the number of pixels $X_1$ is proportional to a lateral size of the scanned image and a resolution (dot per inch: dpi) thereof. For example, when a lateral length of the scanned image is 5 inches and the resolution is 200 dpi, the number of pixels $X_1$ is 1000 pixels. In a case of increasing the resolution to 300 dpi, the number of pixels $X_1$ will be 1500 pixels.

In the handwriting mode, an image $IMG_1'$ (referred to as a display image) that is an area (display area) of a part or an entire part of the original image $IMG_1$ is displayed on the display panel 212. The intermediate image $IMG_2$ is generated by appropriately scaling the display image $IMG_1'$. The number of pixels of the display image $IMG_1'$ is defined as $X_1'$. The number of pixels $X_2$ of the intermediate image $IMG_2$ conforms to a horizontal resolution of the display panel 212. For example, when $X_2$=640 pixels and the number of pixels $X_1'$ of the display image $IMG_1'$ is 640 pixels, the intermediate image $IMG_2$ coincides with the display image $IMG_1'$. For example, when $X_2$=640 pixels and the number of pixels $X_1'$ of the display image $IMG_1'$ is 320 pixels, the intermediate image $IMG_2$ is an image obtained by converting the resolution of the display image $IMG_1'$ twice.

For example, when $X_2$=640 pixels and the number of pixels $X_1'$ of the display image $IMG_1'$ is 1280 pixels, the intermediate image $IMG_2$ is an image obtained by converting the resolution of the display image $IMG_1'$ ½ times.

A horizontal resolution $X_3$ of the touch image $IMG_3$ coincides with a horizontal resolution (resolution capability) of the touch panel 220. In a case where the touch panel 220 has the resolution capability of 10 bits in the horizontal direction, the horizontal resolution results in $X_3=2^{10}=1024$.

The touch image $IMG_3$ is superimposed on the area corresponding to the display image $IMG_1'$. In a case where the resolution of the touch image $IMG_3$ differs from the resolution of the display image $IMG_1'$, the touch image $IMG_3$ is scaled to the overlay image $IMG_3'$ that has the resolution same as the resolution of the display image $IMG_1'$, and then superimposed on the original image $IMG_1$. The superposition may also be performed by pixel replacement or by a blending.

For example, when $X_3$=1024 pixels and the number of pixels $X_1'$ of the display image $IMG_1'$ is 320 pixels, the overlay image $IMG_3'$ is generated by downscaling the touch image $IMG_3$ 320/1024 times.

When $X_3$=1024 pixels and $X_1'$=640 pixels, the overlay image $IMG_3'$ is generated by downscaling the touch image $IMG_3$ 640/1024 times.

When $X_3$=1024 pixels and $X_1'$=1280 pixels, the overlay image $IMG_3'$ is generated by upscaling the touch image $IMG_3$ 1280/1024 times.

Figure 6A:
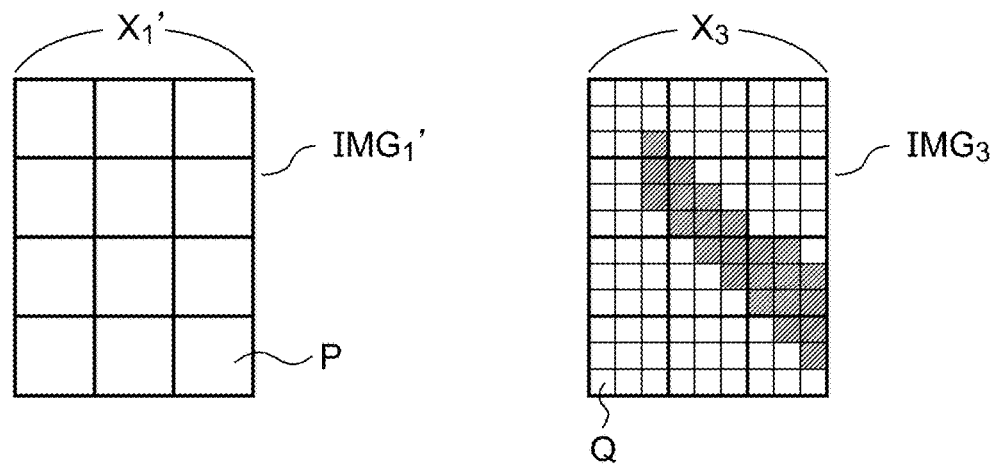
FIG. 6A and FIG. 6B are diagrams each illustrating an exemplary superposition of a touch image on an original image.
Figure 6B:
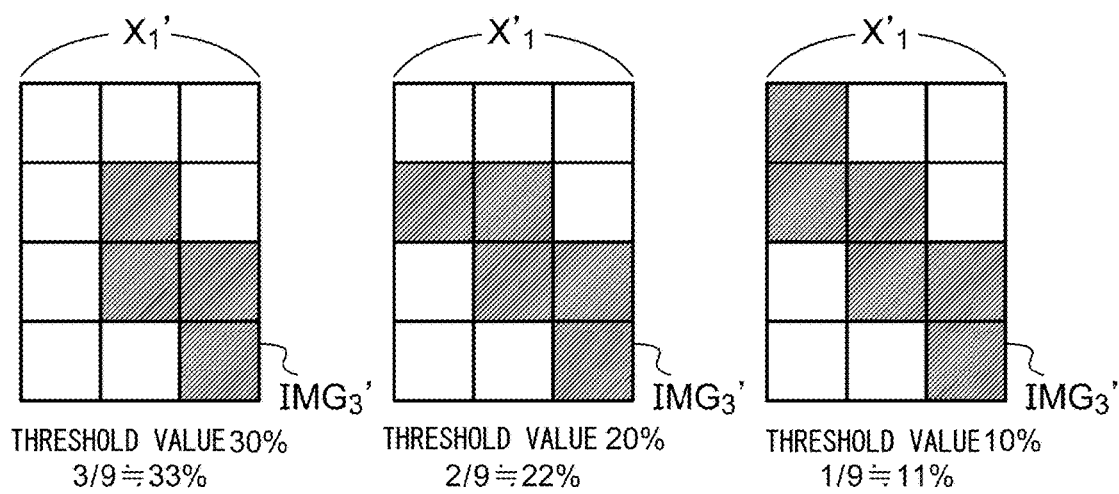

FIG. 6A and FIG. 6B are diagrams each illustrating an exemplary superposition of a touch image $IMG_3$ on an original image $IMG_1$. FIG. 6A illustrates a case where a resolution $X_1'$ of a display area of the original image $IMG_1$ is lower than a resolution $X_3$ of the touch image $IMG_3$. An overlay image $IMG_3'$ is generated by downscaling the touch image $IMG_3$. ON/OFF of respective pixels of the overlay image $IMG_3'$ may be calculated in accordance with the number of a plurality of pixels (ratio) that is turned ON in the touch image $IMG_3$ included therein. The wording "a pixel is turned ON" indicates that there is valid input in the pixel. In this example, one pixel P of the overlay image $IMG_3'$ includes nine pixels Q of the touch image $IMG_3$. When a ratio of the pixels Q that are turned ON exceeds a threshold value, the pixel P may be turned ON. FIG. 6B illustrates overlay images $IMG_3'$ generated under conditions of different threshold values.

Figure 7:
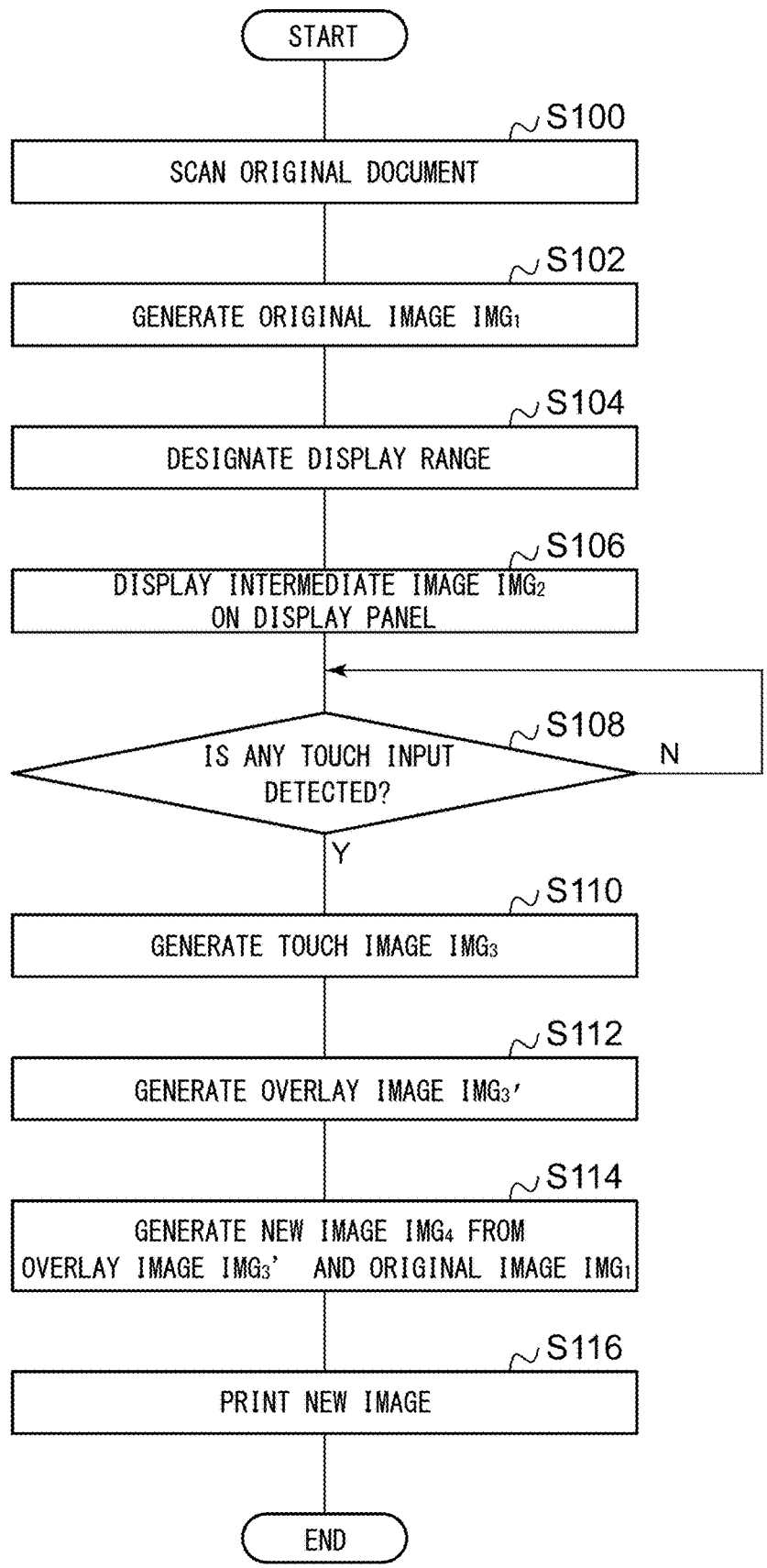
FIG. 7 is a flowchart in the handwriting mode.

FIG. 7 is a flowchart in the handwriting mode. Here, copying is exemplified. First, an original document is scanned (S100) and an original image $IMG_1$ is generated (S102). Subsequently, a part or an entire part of the original image $IMG_1$ is designated as a display range (S104). An intermediate image $IMG_2$ corresponding to the selected part $IMG_1'$ is displayed on the display panel 212 (S106). In this state, touch input to the touch panel 220 is monitored (S108). When touch input is detected (Y in S108), a touch image $IMG_3$ corresponding to the touch input is generated (S110). This touch image $IMG_3$ is converted into an overlay image $IMG_3'$ (S112). Then, the overlay image $IMG_3'$ is superimposed on the original image $IMG_1$, and a new image $IMG_4$ is generated (S114). Then, the new image $IMG_4$ is printed (S116).

The handwriting mode is as described above. Subsequently, the stamp mode will be described.

Figure 8A:
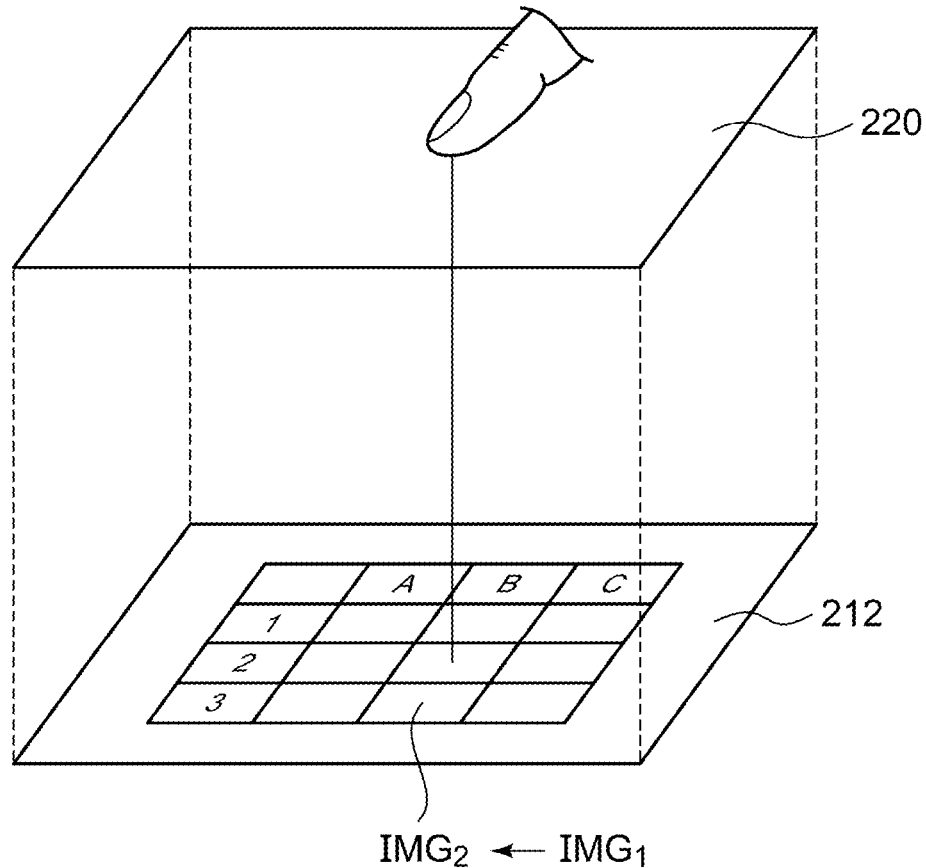
FIG. 8A and FIG. 8B are diagrams to describe a stamp mode.
Figure 8B:
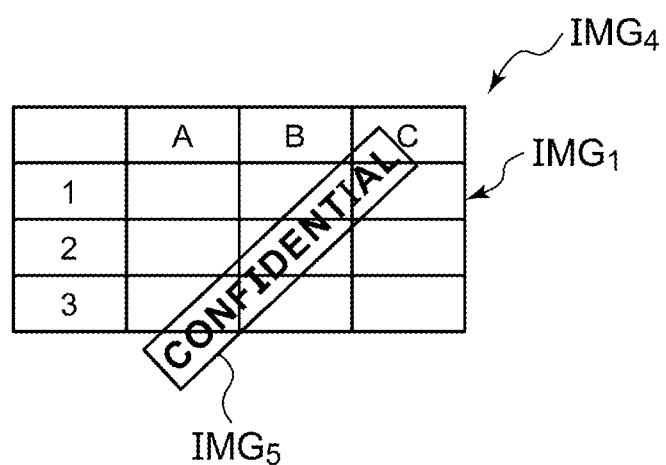

The multi-function peripheral 100 may support the stamp mode in addition to or instead of the handwriting mode. FIGS. 8A and 8B are diagrams to describe the stamp mode. In the stamp mode, when touch input to the touch panel 220 is detected in a state where an intermediate image $IMG_2$ corresponding to an original image $IMG_1$ is displayed on the display panel 212, a stamp image $IMG_5$ is superimposed on a portion (coordinates and/or a range) corresponding to the touch input of the original image $IMG_1$, and a new image $IMG_4$ is generated. Here, character information "CONFIDENTIAL" is exemplified as the stamp image $IMG_5$, but the stamp image $IMG_5$ is not particularly limited.

While the preferred embodiments of the present invention have been described using specific terms, such description is for illustrative purposes only, and it is to be understood that changes and variations may be made without departing from the spirit or scope of the appended claims.

What is claimed is:

1. A multi-function peripheral comprising
   a touch panel monitor including a display panel and a touch panel overlaid on the display panel,
   wherein, in a handwriting mode, an intermediate image corresponding to a display area which is a part, or an entirety of an original image generated by scanning an original document is displayed on the display panel,
   the intermediate image is generated by scaling the displayed original image X1/X2 times where X1 is a horizontal resolution of the displayed original image, and X2 is a horizontal resolution of the display panel, and
   when touch input of a user to the touch panel is detected, a touch image based on the touch input is generated, and the touch image is superimposed on the display area of the original image to generate a first new image,
   an overlay image is generated by scaling the touch image X1/X3 times where X1 is the horizontal resolution of the displayed original image, and X3 is a horizontal resolution of the tough image,
   the overlay image is superimposed on the displayed original image for printing or faxing the generated first new image, and
   wherein, in a stamp mode, when touch input of the user to the touch panel is detected in the state where the intermediate image is displayed on the display panel, a second new image is generated by superimposing a stamp image on a portion corresponding to the touch input of the original image.

2. The multi-function peripheral according to claim 1, wherein a magnification at time of displaying the intermediate image on the display panel can be changed.

3. A processing method of a multi-function peripheral,
   the multi-function peripheral including a touch panel monitor including a display panel and a touch panel overlaid on the display panel,
   the processing method comprising:
   displaying, on the display panel, an intermediate image corresponding to a display area which is a part or an entirety of an original image generated by scanning an original document in a handwriting mode,
   generating the intermediate image by scaling the displayed original image X1/X2 times where X1 is a horizontal resolution of the displayed original image, and X2 is a horizontal resolution of the display panel, and
   monitoring touch input to the touch panels and generating a touch image based on touch input when the touch input of a user to the touch panel is detected; and
   generating a first new image by superimposing the touch image on the displayed original image,
   wherein an overlay image is generated by scaling the touch image X1/X3 times where X1 is the horizontal resolution of the displayed original image, and X3 is a horizontal resolution of the tough image, the overlay image is superimposed on the displayed original image, and wherein, in a stamp mode, when touch input of the user to the touch panel is detected in the state where the intermediate image is displayed on the display panel, a second new image is generated by superimposing a stamp image on a portion corresponding to the touch input of the original image.

4. The processing method according to claim 3, further comprising printing the new image.

5. The processing method according to claim 3, further comprising faxing the new image to a designated destination.

\* \* \* \* \*